Figure 1:
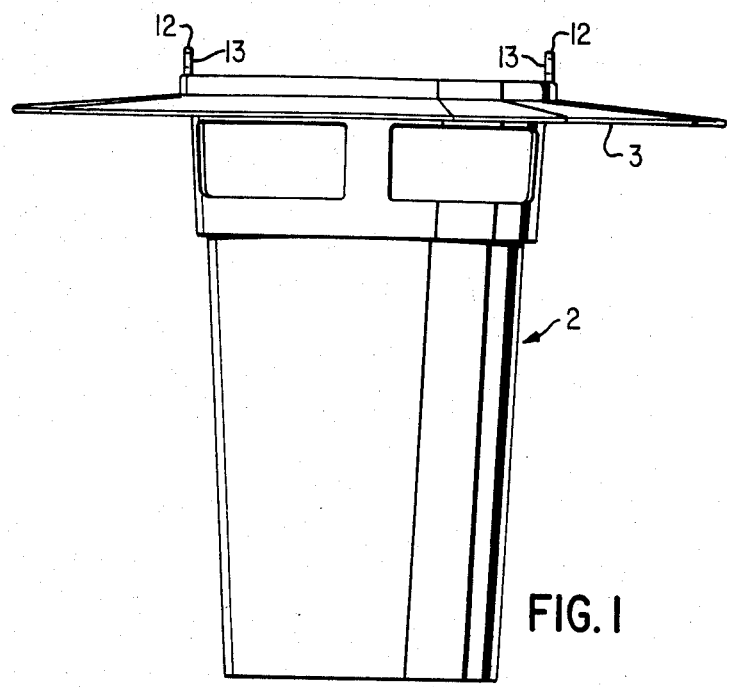

United States Patent [19]

Jobin et al.

[11] Patent Number: 4,642,936
[45] Date of Patent: Feb. 17, 1987

[54] MULTI-FUNCTIONAL HIGH CAPACITY INSECT TRAP

[75] Inventors: Luc Jobin, Ste-Foy; Charles Coulombe, St.-Joseph de Lévis, both of Canada

[73] Assignee: Canadian Patents and Development Limited, Ottawa, Canada

[21] Appl. No.: 731,726

[22] Filed: May 8, 1985

[51] Int. Cl.⁴ ............................................. A01M 1/02
[52] U.S. Cl. ..................................................... 43/122
[58] Field of Search .................. 43/107, 121, 122, 131, 43/132.1, 118

[56] References Cited

U.S. PATENT DOCUMENTS

| | | | |
|---|---|---|---|
| 584,378 | 6/1897 | Lewis ...................................... | 43/107 |
| 1,496,135 | 6/1924 | Schwiening ............................ | 43/118 |
| 2,997,806 | 8/1961 | Duvall ..................................... | 43/121 |
| 3,803,753 | 4/1974 | Feigin et al. ..................... | 43/132.1 X |
| 4,035,946 | 7/1977 | Rapp et al. ............................ | 43/131 |
| 4,400,903 | 8/1983 | Seidenberger ........................ | 43/122 |
| 4,501,088 | 2/1985 | Boisvert et al. ...................... | 43/122 |

FOREIGN PATENT DOCUMENTS 2539954  8/1984  France ................... 43/122

Primary Examiner—Nicholas P. Godici
Assistant Examiner—Carmine Cuda
Attorney, Agent, or Firm—Francis W. Lemon

[57] ABSTRACT

A multi functional high capacity insect trap for efficiently trapping insects especially flying insects. The insect trap uses a lure to attract the insects and comprises a base wall, a side wall and a funnel member, attached to the side wall, with its narrow end directed at the base wall. The base and side walls with the funnel member delimit an insect receiving chamber for retaining the insects in the trap. The side wall has also openings situated above the funnel member and a cover attached over the side wall, the cover being equipped with a lure mounting means for receiving a lure.

4 Claims, 6 Drawing Figures

MULTI-FUNCTIONAL HIGH CAPACITY INSECT TRAP

This invention relates to insect traps, particularly insect traps designed to capture flying insects which may also be adapted for use as pitfall traps for crawling insects.

The entomological literature is replete with designs for insect traps which take a bewildering variety of forms. Prior art traps nearest to this invention are those found in W. H. Nightingales's U.K. Patent Application GB No. 2052942A and the Stored Product Insect (SPI TM) Trap produced by International Peromones Ltd. of Warrington, Cheshire, U.K.

Problems inherent in most insect traps include (1) trapping efficiency measured in terms of (a) the ability of the trap, which usually contains a lure, to attract insects, (b) the likelihood that an insect on encountering the trap will enter it and (c) the ability of the trap to retain trapped insects, (2) the speed with which such traps become filled (saturated) with insects, which can affect all the explicit measures of trapping efficiency laid out above, and (3) inflexibility of trap design making improvements in efficiency and effectiveness difficult to achieve.

It is an object of the present invention to obviate as many of these problems as possible and provide a trap with high trapping efficiency which may be used in many different ways to catch different insect species with very different habits. This will thus allow the user to be assured of high trapping efficiency over an extended period provided, of course, that the user places the traps in a suitable environment at a suitable time for insect trapping to be effected. This more effectively extends the use of insect traps to encompass long term insect control programs as well as shorter term detection, control and monitoring programs.

According to the present invention there is provided an insect trap comprising:

a base having a base wall and side wall, the latter wall having a plurality of circumferentially disposed openings distal to the base wall, the openings being selected to admit insects;

a frusto-conical shaped funnel member having an included angle of the order of 90° and a diameter at its narrow end of approximately ⅓ of the diameter of its wide end and with its narrow end directed towards the bas wall, a ledge on the side wall for removably attaching the funnel member to the side wall below the openings whereby the base wall, the side wall and the funnel member delimit a receiving chamber for retaining insects in the trap, and the funnel member will not be readily dislodged in use;

a cover having lure holder mounting means which is situated on an underneath portion of the cover, the cover being for attachment to the side wall.

Such an insect trap is preferably made of plastic materials which may be of the same or different colours. The base member may be substantially cylindrical or of a truncated coniform shape and may have at least one drain hole in the base wall. The side wall of the base may possess two rows of laterally placed openings.

Coupling means for attaching the base to the cover preferably comprises a plurality of arcuate flanges spaced around the outer end of the side wall of the base and coupling means for attaching the cover to the base comprises a plurality of arcuate flange receiving members mounted on the cover. A lure holder may be mounted on the cover by friction fit attachment means.

Such an insect trap can be used as a pitfall trap as described below. It may also be used in combination with a funnel member capable of being received in an operating position by the side wall of the base and a lure holder. The funnel member may be frusto-conical, may have a 45° slope, which gives an included angle of 90°, and have a small hole located in the slope of the funnel suitable for carrying a hook from which may be suspended an insecticidal strip.

The lure holder preferred comprises a frusto-conical mesh so constructed and arranged as to impede direct contact of a lure, which may be contained therein, with insects attracted thereto.

Preferred embodiments of such an insect trap are made of plastic components and comprise a funnel member, a base, having a base wall and a side wall capable of receiving, in an operating position therein, said funnel member with its narrow end directed towards the base wall, said funnel member further having (i) a plurality of rectangular or substantially circular laterally spaced openings in one or two rows distal to the base wall with respect to the operating position of the funnel member and (ii) distal to the base wall with respect to the plurality of laterally spaced openings, a plurality of arcuate flanges spaced around the outer end of the side wall, a cover at least 1.5 times as far across as the largest lateral dimension of the base when said base is substantially upright, said cover having (i) a plurality of arcuate flange receiving members for cooperation with said plurality of arcuate flanges and (ii) friction fit mounting means for a lure holder, and a lure holder.

Figure 2:
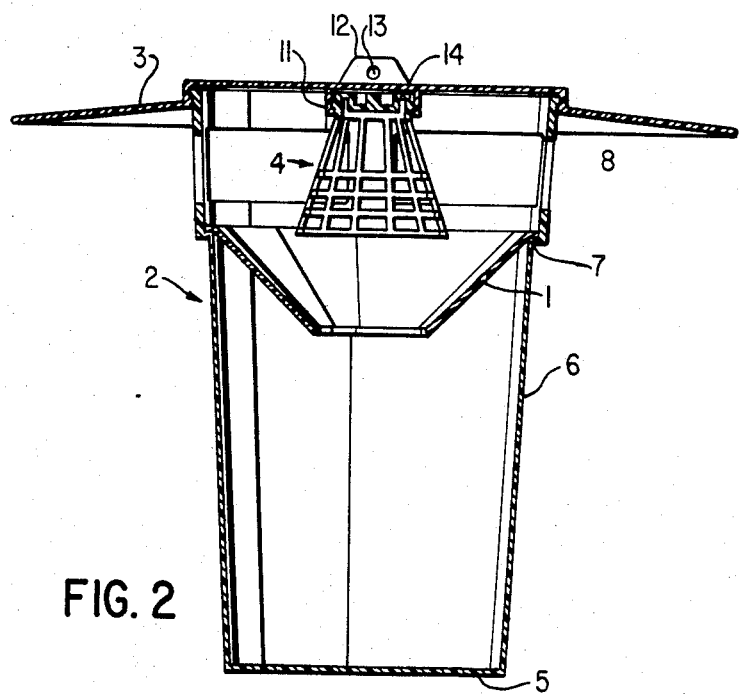
Figure 4:
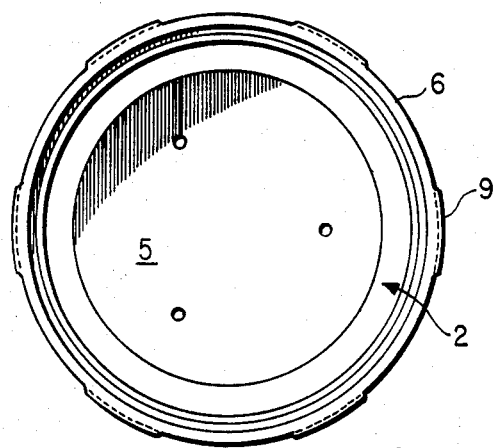
Figure 3:
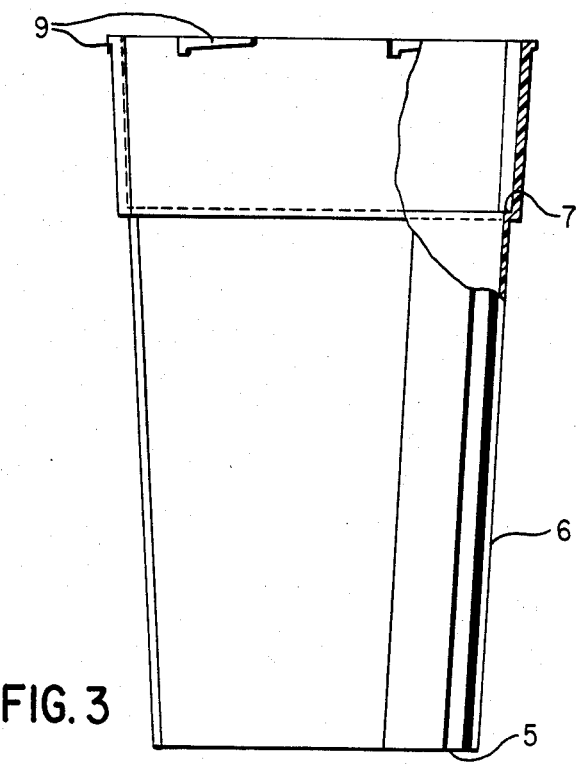
Figure 5:
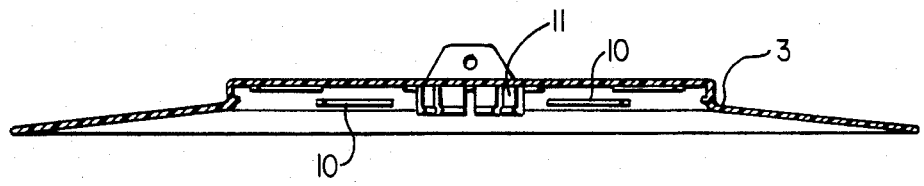
Figure 6:
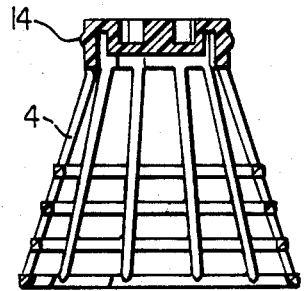

In the accompanying drawings, which illustrate by way of example an embodiment of the present invention:

FIG. 1 is an orthogonal side view of an insect trap;
FIG. 2 is a vertical sectional view of an insect trap along 2—2;
FIG. 3 is a side view of the base, partially sectioned;
FIG. 4 is a top view of the base;
FIG. 5 is a vertical sectional view of the cover;
FIG. 6 is a side view of the lure holder.

Referring now to FIGS. 1-6 there is shown a frusto-conical element 1 mounted inversely within a base 2 upon which is mounted a cover 3. Upon cover 3 is mounted lure holder 4 in which a lure (not shown) is adhesively secured therein in a conventional manner.

Base 2 has base wall 5 and side wall 6. Side wall 6 has ledge 7 to receive frusto-conical element 1 which fits snugly so as not to be readily dislodged in use. Side wall 6 further has laterally placed openings 8 and arcuate flanges 9.

Cover 3 has arcuate flange receiving members 10 and a friction fit member 11 for receiving the lure holder 4. Cover 3 further has flange 12 within which is an eye 13. Lure holder 4 comprises a frusto-conical cage and has a friction fit member 14 which engages with friction fit member 11 of cover 3.

In operation, frusto-conical element 1 is pushed into snug engagement on the ledge 7 of side wall 6 of the base 6, as illustrated in FIG. 2. A lure, commonly an insect pheromone, is introduced into the lure holder 4 which is then snapped into place with the cover 3 by pushing friction fit member 14 within friction fit member 11. The cover-lure holder-lure combination is then attached to the base-frusto-conical member combination and the trap is then ready for use, commonly being suspended at an appropriate height from, for example, a tree or an overhanging post. We have found such a trap to be particularly useful in the detection and monitoring of spruce budworm moths.

Applicants' (Jobin-Coulombe) trap was compared with the SPI TM trap in a series of competitive field experiments. A solid polyvinyl chloride plastic pellet containing Fulure TM was used as a bait. In all plots traps were set in two parallel lines at a distance of 40 mm between lines and traps. Table 1 illustrates the results of these field experiments at five different locations, four at ground level and a fifth at the mid-crown level of the trees. As can be seen Applicants' trap captured two to four times as many moths as the SPI TM trap. These results indicate that Applicants' trap was significantly more efficient ($P<0.01$) than the SPI TM trap in both types of location. As a result of these and similar, comparable observations, Applicants' trap has been adopted as the standard trap of choice by The Canadian Forestry Service and the U.S. Forestry Service in ongoing spruce budworm detection and monitoring programs.

TABLE I

Spruce budworm male moths captured in three Jobin-Coulombe (J-C) and three SPI (TM) traps in each of five sites established along road sides in 1984.

| Trapping location | Trap type | Number of SBW male moths/trap | | | | | Average number of males (%) |
|---|---|---|---|---|---|---|---|
| | | Min. | Max. | X | S | C.V. | |
| Ground | J-C | 98 | 112 | 106 | 7.4 | .07 | 69.0 |
| (2 m) | SPI | 44 | 72 | 56 | 14.4 | .26 | 30.9 |
| | J-C | 194 | 339 | 264 | 72.6 | .27 | 67.8 |
| | SPI | 92 | 139 | 114 | 23.5 | .20 | 32.2 |
| | J-C | 250 | 318 | 268 | 43.5 | .16 | 65.1 |
| | SPI | 134 | 142 | 157 | 34.3 | .22 | 34.9 |
| | J-C | 616 | 869 | 735 | 127.1 | .17 | 69.8 |
| | SPI | 267 | 402 | 313 | 76.5 | .24 | 30.2 |
| Mid- | J-C | 153 | 222 | 177 | 38.7 | .22 | 79.7 |
| Crown | SPI | 39 | 70 | 51 | 16.6 | .33 | 20.3 |

Other variants of this trap that have been developed include (a) a dark green trap with a double row of smaller rectangular lateral openings which has been found to be particularly suitable for gypsy moth detection and monitoring, and (b) a general purpose trap with substantially circular lateral openings. Shape, size and disposition of the lateral openings appear to be significant factors in determining the species specificity of these traps.

Smoke tests in wind tunnels have subsequently provided evidence which may help to explain the high efficiency of this trap. The cover which was originally designed as a rain guard appears also to have the benefits of (i) shearing wind over the trap thus preventing pheromones from wafting over the top of the trap. This appears to be an important factor in preventing contamination of the upper surface of the cover by pheromone components (which, generally, have a very low vapour pressure and will readily condense), (ii) preventing wing-fanning (sexually excited) moths from going up the side of the trap and off the top but deflecting them into the trap and (iii) at high wind speeds deflecting evaporated pheromone as it leaves the trap down the side walls of the trap where it may recondense. This recondensed pheromone may serve to stimulate wing-fanning of moths that land on the trap and serve to promote movement of such moths up the side wall towards the lateral openings and into the trap.

As a further demonstration of the versatility of this insect trap, the preferred embodiment illustrated has been used, without the frusto-conical funnel element and the lure-holder as a pitfall trap to catch beetles and other ground-crawling insects. The trap was buried in the soil to the bottom of the laterally placed openings and was baited with food placed in the base. The operator may place bait simply in the base or, alternatively, may insert and use the lure holder to hold such bait. The rim of the cover is wide enough to keep out rain.

We claim:
1. An insect trap comprising:
   a base having a base wall and side wall, the latter wall having a plurality of circumferentially disposed openings distal to the base wall, the openings being selected to admit insects;
   a frusto-conical shaped funnel member having an included angle of the order of 90° and a diameter at its narrow end of approximately ⅓ of the diameter of its wide end and with its narrow end directed towards the base wall, a ledge on the side wall for removably attaching the funnel member to the side wall below the openings whereby the base wall, the side wall and the funnel member delimit a receiving chamber for retaining insects in the trap, and the funnel member will not be readily dislodged in use;
   a cover having lure holder mounting means which is situated on an underneath portion of the cover, the cover being for attachment to the side wall.

2. The insect trap of claim 1 in combination with a lure holder attached to the cover and comprising a frusto-conical shaped mesh with the wide end directed towards the wide end of the funnel member to impede direct contact of a lure, which may be contained therein, with insects arriving from the openings, the mesh having an aperture for accessing the lure which may be contained in the lure holder mounting means.

3. An insect trap as defined in claim 2, wherein an insecticidal fastening means is provided in the funnel member for holding an insecticidal means at a remote position from the lure which may be positioned in the lure holder mounting means.

4. An insect trap as defined in claim 2 wherein:
   an insecticidal fastening means is provided in the funnel member for holding an insecticidal means at a remote position from a lure which may be contained in the lure holder mounting means; and
   the cover comprises an approximately flat shape for facilitating movement of wind over a lure, which may be contained in the lure holder mounting means, and deflection of lure vapor down the side wall, the lateral dimension of the cover being at least 1.5 times the largest lateral dimension of the base; and coupling means removably attaching the cover to the side wall, the coupling means comprising a plurality of arcuate flanges spaced around outer end of the side wall and a plurality of arcuate flange receiving members mounted on the cover.

* * * * *